United States Patent [19]

Schwarz et al.

[11] Patent Number: 4,927,116

[45] Date of Patent: May 22, 1990

[54] PLUG VALVE

[75] Inventors: Albert J. Schwarz, Lincolnwood; Anthony M. Pietramale, Schaumburg, both of Ill.

[73] Assignee: The Pullman Company, Princeton, N.J.

[21] Appl. No.: 264,996

[22] Filed: Oct. 31, 1988

[51] Int. Cl.⁵ .............................................. F16K 5/04
[52] U.S. Cl. ..................................... 251/312; 251/287
[58] Field of Search ................ 251/304, 309, 312, 287

[56] References Cited

U.S. PATENT DOCUMENTS

| 3,563,512 | 2/1971 | Hauffe | 251/312 |
| 3,889,923 | 6/1975 | Saville et al. | 251/312 X |
| 4,262,880 | 4/1981 | Danko et al. | 251/288 |

FOREIGN PATENT DOCUMENTS

| 875420 | 7/1971 | Canada | 251/312 |
| 1531474 | 11/1978 | United Kingdom | 251/309 |

Primary Examiner—John Fox
Attorney, Agent, or Firm—Russell E. Baumann

[57] ABSTRACT

A quarter-turn, on-off plug valve having a valve body provided with a recess opening through a first portion of the body and closed at the opposite end by an integral portion of the body. A pair of stops are provided on a stem portion of the plug for accurately limiting the rotation of the plug to the 90° different open and closed positions of the valve. The stops are defined by flat surfaces engaging a cylindrical retaining pin extending chordally through an upstanding annular wall portion of the body so as to provide improved accurate positioning of the plug in the open and closed positions of the valve.

11 Claims, 1 Drawing Sheet

PLUG VALVE

TECHNICAL FIELD

This invention relates to plug valves and more specifically to quarter-turn, on-off plug valves.

BACKGROUND ART

In one conventional form of quarter-turn, on-off valve, the valve includes a cylindrical plug rotatable in a through hole in a valve body. A handle is provided on an exposed portion of the plug for rotating the plug 90° to either align or disalign a through hole in the plug with the inlet and outlet ports at opposite ends of the body.

It is conventional in such plug valves to provide a through bore extending axially perpendicular to the flow path between the inlet and outlet ports. The plug protrudes through both the top and bottom of the body in the bore and is sealed therein by elastomeric O-rings provided in annular grooves at opposite ends of the plug.

It is further conventional to provide an O-ring on the surface of the plug 90° from the plug's flow path bore, which seats about the inlet port, so as to seal off the port when the plug is rotated to the off position.

The axial positioning of the plug within the body is controlled by means of a snap ring located in an annular groove at the bottom end of the plug and by the handle, which is larger than the plug-receiving bore in the body at the other end of the plug.

A locating pin is conventionally pressed into a hole at the top of the body parallel to the axis of the plug and engages stops integral with the plug to provide rotational limit stops for the plug.

The conventional plug valve, as discussed above, is disadvantageous in the requirement of the provision of seals at both ends of the plug. Further, the projection of the plug at the bottom of the valve is disadvantageous in that such exposure thereof may result in interference with the free rotation of the plug, as by an adjacent object contacting the lower end of the plug. Further, the conventional stop pin provided for limiting the rotation of the plug is openly exposed to dirt and foreign matter which may, under adverse conditions, undesirably restrict full rotation of the plug between the on and off positions.

DISCLOSURE OF INVENTION

The present invention comprehends an improved plug valve eliminating the disadvantages of the prior art plug valves of this type in a novel and simple manner.

In the illustrated embodiment, the plug valve includes a body defining a flow chamber recess defining an axis and opening axially outwardly through an opening in a first portion of the body, an inlet port opening through a second portion thereof to the recess, and an outlet port opening through a third portion thereof from the recess transversely to the axis of the recess, a flow control plug coaxially rotatably received in the recess, and defining a through bore extending axially transversely to the axis of rotation of the plug providing a flow passage through the plug from the inlet port to the outlet port in an open arrangement of the valve, a stem projecting from the plug outwardly through the first body portion opening, a manipulating handle connected to the stem outwardly of the first body portion opening, a retaining element extending through the first body portion and across the opening laterally adjacent the stem and axially between the handle and the plug for retaining the plug rotatably in the recess, and means for sealing the plug to the body including a first annular seal extending coaxially about the plug to seal the plug to the body in the recess axially inwardly of the first body portion opening, and a second annular seal carried by the plug and defining an axis intersecting the axis of the through bore for sealing engagement with the body about the inlet port in a closed arrangement of the valve.

The retaining element, in the illustrated embodiment, comprises a pin fixedly mounted to the first body portion.

In the illustrated embodiment, the first body portion comprises an annular, upstanding wall coaxially of the plug recess.

The handle slidably engages the wall in the assembled arrangement of the valve for limiting axial inward movement of the plug into the recess, so as to maintain the plug spaced from the body at the inner end of the recess, in the illustrated embodiment.

The plug defines an axially outer surface at the first body portion opening slidably engaged by the retaining member for preventing axial outward movement of the plug from the recess.

In the illustrated embodiment, the valve further includes means for limiting the rotation of the plug about the axis thereof, including stop means rotatable with the plug for selectively engaging the retaining element for limiting the rotation of the plug about the axis thereof.

The stop means comprises a projection on the stem formed integrally therewith. In the illustrated embodiment, the stop means comprises a pair of projections on the stem for selectively engaging the retaining element.

In the illustrated embodiment, the retaining element comprises a split tubular pin.

The stop means, in the illustrated embodiment, defines a flat surface engaging the pin, with a line contact in an extreme position of the rotation of the plug.

In the illustrated embodiment, the stop means defines a pair of such flat surfaces respectively engaging the pin at the extreme positions of the plug rotation.

The plug valve of the present invention is extremely simple and economical of construction, while yet providing the highly desirable features discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
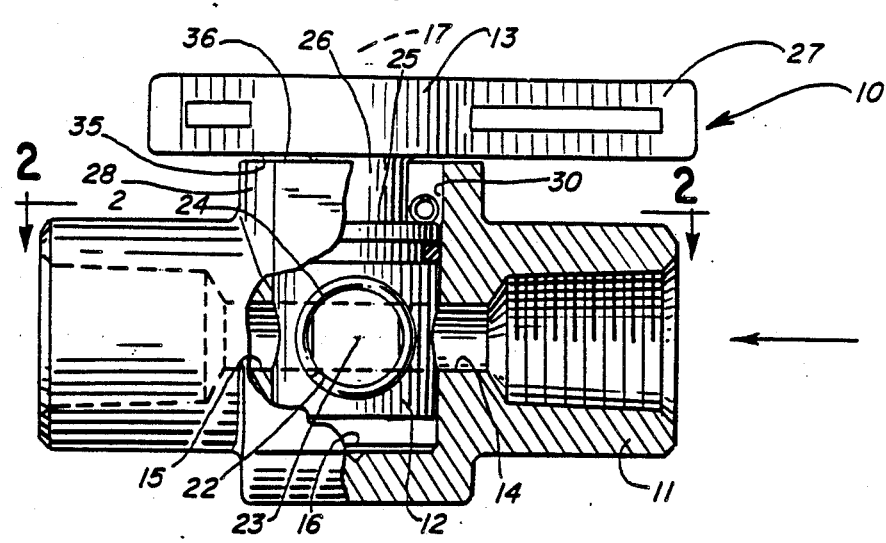
FIG. 1 is a side elevation, with a portion shown in diametric section, of a plug valve embodying the invention.

In the illustrative embodiment of the invention as disclosed in the drawing, a plug valve generally designated 10 is shown to comprise a quarter-turn on-off plug valve having a body 11, a plug 12, and a manipulating handle 13.

Figure 3:
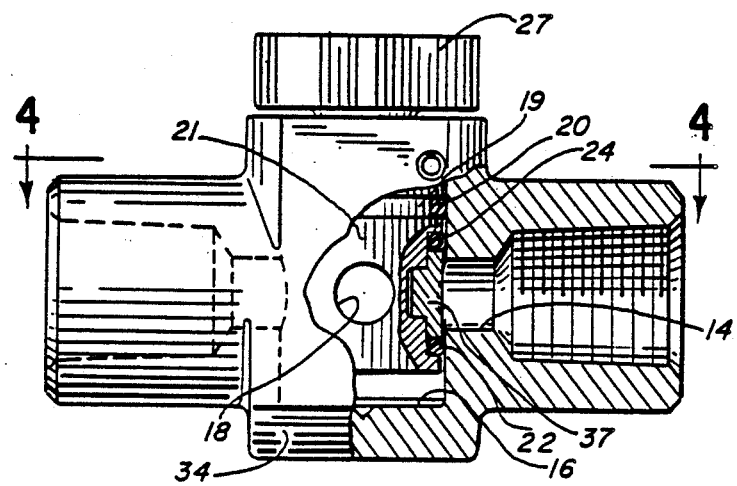
FIG. 3 is a view similar to that of FIG. 1, but with the plug in an off position.

Body 11 defines an inlet port 14 and an opposite outlet port 15, and a flow chamber recess 16 intermediate the inlet and outlet ports. Plug 12 comprises a cylindrical plug rotatable about an axis 17 thereof to dispose a transverse flow passage through bore 18 therein selectively in alignment with the inlet and outlet ports 14 and 15, in an open extreme position of the valve, as shown in FIG. 1, and in a perpendicular transverse relationship thereto in a closed position of the valve, as shown in FIG. 3.

Plug 12 is provided with an annular radially outwardly opening recess 19 extending coaxially about axis 17, receiving an annular O-ring 20 for sealing the outer end 21 of the plug to the body in an outer portion of the recess 16.

The cylindrical surface of the plug further defines an annular recess 22 extending about an axis 23 perpendicular to axis 17 and at right angles to the through bore 18. A second O-ring 24 is provided in groove 22 for sealing the plug about the inlet port 14 in a closed arrangement of the valve, as shown in FIG. 3.

Plug 12 further defines an axially outer planar annular surface 25. Extending integrally outwardly from the plug surface 25 is a stem 26 having a handle 27 formed integrally with the outer end thereof for manipulation of the plug between the open and closed positions.

Figure 4:
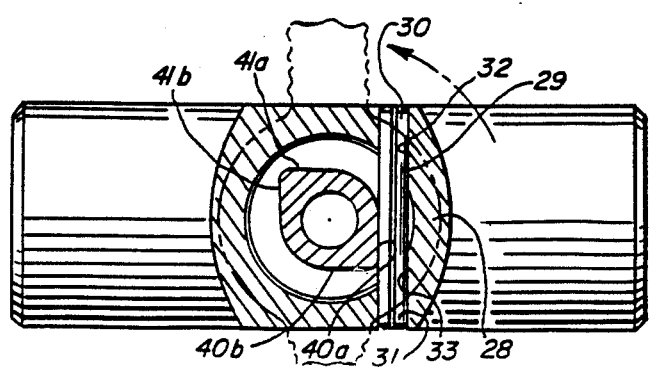
FIG. 4 is a section taken substantially along the line 4—4 of FIG. 3.

The valve body defines an annular upstanding wall 28 coaxially of the recess 16. A retaining element which, in the illustrated embodiment, comprises a split tubular pin 29, has opposite ends 30 and 31 frictionally retained in aligned bores 32 and 33 extending chordally through the annular wall 28, as shown in FIG. 4. Pin 29 extends chordally across an extension 30 of the recess 16 within the annular wall 28, to be slidably engaged with the outer surface 25 of the plug to prevent axial outward displacement of the plug from recess 16.

Figure 2:
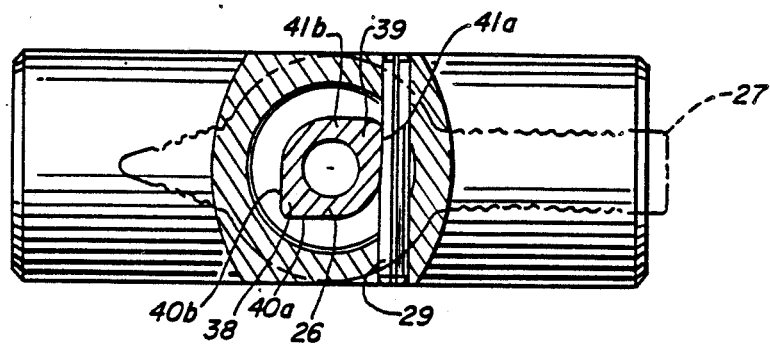
FIG. 2 is a horizontal section taken substantially along the line 2—2 of FIG. 1.

As illustrated in FIGS. 2 and 4, formed integrally with stem portion 26 is a pair of diametrically opposite projections 38 and 39 defining flat side surfaces 40a and 40b and 41a and 41b, respectively. The side surfaces define stops which, when engaged with the pin 29, limit the rotation of the plug accurately to the open position of FIG. 1 and to the 90° rotated closed position of FIG. 3. Either surfaces 40a and 41a or surfaces 40b and 41b can be used to engage pin 29 and the dual surface design allows the plug to be reversibly disposed in the body so that sealing can be effected at either inlet port 14 (as shown) or at outlet port 15. As shown, the surfaces 40a and 41a have line contact with the edge of the cylindrical stop pin in the stop positions illustrated in FIGS. 2 and 4.

As shown, the body defines a wall portion 34 closing the bottom of recess 16, thereby avoiding the necessity for use of a sealing O-ring in the lower portion of the plug valve.

The handle 27 defines a lower surface 35 slidably engaging the outer surface 36 of the annular wall 28 to limit the axial inward movement of the plug valve to align the through bore 18 thereof with the inlet and outlet ports in the open arrangement of the valve. As indicated above, the stop pin 29 controls the axial displacement outwardly from the recess of the plug valve so as to cooperate with the surfaces 35 and 36 in retaining the plug valve accurately aligned with the inlet and outlet ports, as shown in FIGS. 1 and 3.

In the illustrated embodiment, the annular groove 22 is defined by a recess in the sidewall of the plug and an insert 37 press-fitted thereinto, as seen in FIG. 3. The stop element 29 may comprise a commercially available spring pin and, in the illustrated embodiment, has a nominal diameter of 0.094" and a length of ¾". The body of the valve may be formed of forged brass. The unitary plug and handle element may be formed of any suitable material. In the illustrated embodiment, the plug and handle element is formed of a synthetic resin. One excellent resin for such element is a glass-filled acetal copolymer such as marketed by Celanese Corporation under the trademark CELCON. The O-rings may be suitably lubricated for facilitated selective movement of the valve between the open and closed positions.

The stop pin may be readily removed when desired to permit withdrawal of the plug from the valve for maintenance purposes and readily replaced upon reassembly of the valve.

The plug valve of the present invention is extremely simple and economical of construction, utilizing a single sealing O-ring for sealing the plug to the body in the open position of the valve and a single O-ring for sealing the plug to the body in the closed position of the valve. The arrangement of the valve assures accurate alignment of the through bore in the plug with the inlet and outlet ports of the valve body so as to minimize pressure drop through the valve in the open arrangement.

The foregoing disclosure of specific embodiments is illustrative of the broad inventive concepts comprehended by the invention. It is to be understood that the same novel features described with regard to the on-off plug valve of this patent application could equally well be used with a plug valve having more than one outlet passage and associated elements.

We claim:

1. A plug valve comprising:
   a body defining a cylindrical flow chamber recess defining an axis and opening axially outwardly through an opening in a first portion of the body, an inlet port opening through a second portion thereof to said recess transversely to the axis of the recess, an outlet port opening through a third portion thereof from said recess transversely to the axis of the recess;
   a straight-walled cylindrical flow control plug coaxially rotatably received in said recess through said outwardly axial opening, and defining a through bore extending axially transversely to the axis of rotation of the plug in the recess providing a flow passage through the plug from said inlet port to said outlet port in an open arrangement of the valve;
   a stem projecting from said plug outwardly through said first body portion opening;
   a manipulating handle connected to said stem outwardly of said first body portion opening;
   a single member retaining element extending through said first body portion and across said opening laterally adjacent said stem and axially between said handle and said plug for securely retaining said plug rotatably in said recess and for accurately locating the plug and body ports for assuring full flow;
   means for sealing the plug to said body including a first annular seal extending coaxially about the plug to seal the plug to the body in said recess axially inwardly of said first body portion opening, and a second annular seal carried by the plug and defining an axis intersecting the axis of said through bore for sealing engagement with the body about said inlet port in a closed arrangement of the valve;

stop means rotatable with said plug for selectively engaging said retaining element for accurately and precisely limiting the rotation of the plug about the axis thereof, thereby precisely controlling the open and close positions of the valve.

2. The plug valve of claim 1 wherein said stop means comprises a projection on said stem.

3. The plug valve of claim 1 wherein said stop means comprises a projection formed integrally on said stem.

4. The plug valve of claim 1 wherein said retaining element comprises a pin fixedly mounted to said first body portion.

5. The plug valve of claim 1 wherein said stop means comprises a plurality of projections on said stem selectively engaging said retaining element.

6. A plug valve comprising:

a body defining a cylindrical flow chamber recess defining an axis and opening axially outwardly through an opening in a first portion of the body, an inlet port opening through a second portion thereof to said recess transversely to the axis of the recess, and an outlet port opening through a third portion thereof from said recess transversely to the axis of the recess;

a straight-walled cylindrical flow control plug coaxially rotatably received in said recess through said outwardly axial opening, and defining a through bore extending axially transversely to the axis of rotation of the plug in the recess providing a flow passage through the plug from said inlet port to said outlet port in an open arrangement of the valve;

a stem projecting from said plug outwardly through said first body portion opening;

a manipulating handle connected to said stem outwardly of said first body portion opening;

a removable, externally accessible single member retaining element extending through said first body portion and across said opening laterally adjacent said stem and axially between said handle and said plug for retaining said plug rotatably in said recess;

means for sealing the plug to said body including a first annular seal extending coaxially about the plug to seal the plug to the body in said recess axially inwardly of said first body portion opening, and a second annular seal carried by the plug and defining an axis intersecting the axis of said through bore for sealing engagement with the body about said inlet port in a closed arrangement of the valve; and stop means rotatable with said plug for selectively engaging said retaining element for accurately and precisely limiting the rotation of the plug about the axis thereof, thereby precisely controlling the open and close positions of the valve.

7. The plug valve of claim 6 wherein said retaining element comprises a pin fixedly mounted to said first body portion.

8. The plug valve of claim 6 wherein said retaining element comprises a pin having distal ends mounted to said first body portion.

9. The plug valve of claim 6 wherein said stop means defining a plurality of stop surfaces selectively engaging said retaining element in an extreme position of rotation of said plug.

10. The plug valve of claim 9 wherein said stop means defines a pair of flat surfaces selectively respectively engaging said retaining element in the open and closed positions of said plug.

11. The plug valve of claim 9 wherein said stop means defines two pairs of flat surfaces, one surface of each pair selectively respectively engaging said retaining element in the open and closed positions of said plug.

* * * * *